United States Patent
Ashry Othman

(10) Patent No.: US 10,135,472 B1
(45) Date of Patent: Nov. 20, 2018

(54) APPARATUS AND METHODS FOR COMPENSATING RADIO FREQUENCY TRANSMITTERS FOR LOCAL OSCILLATOR LEAKAGE

(71) Applicant: ANALOG DEVICES GLOBAL, Hamilton (BM)

(72) Inventor: Ahmed Mohammad Ashry Othman, Cairo (EG)

(73) Assignee: Analog Devices Global, Hamilton (BM)

(*) Notice: Subject to any disclaimer, the term of this patent is extended or adjusted under 35 U.S.C. 154(b) by 0 days.

(21) Appl. No.: 15/690,009

(22) Filed: Aug. 29, 2017

(51) Int. Cl.
*H04B 1/04* (2006.01)

(52) U.S. Cl.
CPC ... *H04B 1/0475* (2013.01); *H04B 2001/0408* (2013.01)

(58) Field of Classification Search
CPC .............. H04B 1/0475; H04B 2001/0408
See application file for complete search history.

(56) References Cited

U.S. PATENT DOCUMENTS

| | | |
|---|---|---|
| 6,704,551 B2 | 3/2004 | Riou et al. |
| 7,280,805 B2 | 10/2007 | Xu et al. |
| 7,319,724 B2 | 1/2008 | Kishi |
| 7,398,056 B1 | 7/2008 | Ebert et al. |
| 7,672,364 B2 | 3/2010 | Kang et al. |
| 8,284,824 B1 | 10/2012 | Smaini et al. |
| 8,340,167 B2 | 12/2012 | Feng et al. |
| 8,718,577 B1 | 5/2014 | Smidth |
| 8,913,694 B2 | 12/2014 | Al-qaq et al. |
| 9,008,161 B1 | 4/2015 | Chang et al. |
| 9,300,444 B2 | 3/2016 | Hormis et al. |
| 9,673,847 B1 | 6/2017 | Mayer et al. |
| 2003/0206603 A1 | 11/2003 | Husted |
| 2004/0132424 A1* | 7/2004 | Aytur ............... H04B 1/0475 455/335 |
| 2006/0034356 A1 | 2/2006 | Fechtel |
| 2007/0072571 A1* | 3/2007 | Sun ................. H03D 3/008 455/280 |
| 2009/0247102 A1* | 10/2009 | Hsieh ............... H04B 1/30 455/226.1 |

(Continued)

FOREIGN PATENT DOCUMENTS

| | | |
|---|---|---|
| CN | 103916345 A | 7/2014 |
| KR | 10-0737747 B1 | 7/2007 |
| WO | WO2017080492 A1 | 5/2017 |

OTHER PUBLICATIONS

Anttila et al. "Joint Mitigation of Power Amplifier and I/Q Modulator Impairments in Broadband Direct-Conversion Transmitters" IEEE, 2010, 9 pages.

(Continued)

*Primary Examiner* — Nguyen Vo
(74) *Attorney, Agent, or Firm* — Knobbe, Martens, Olson & Bear, LLP

(57) ABSTRACT

Apparatus and methods for compensating radio frequency (RF) transmitters for local oscillator (LO) leakage are provided herein. In certain configurations herein, a transmitter generates an RF transmit signal based on mixing an input signal with an LO signal. Additionally, the transmitter is calibrated to compensate for LO leakage, which provides a number of benefits, including lower levels of undesired emissions from the transmitter.

20 Claims, 13 Drawing Sheets

(56) References Cited

U.S. PATENT DOCUMENTS

| | | | |
|---|---|---|---|
| 2011/0013724 A1 | 1/2011 | Metreaud et al. | |
| 2011/0053547 A1* | 3/2011 | Yahav | H03D 7/00 |
| | | | 455/317 |
| 2011/0292978 A1 | 12/2011 | Kravitz | |
| 2012/0077453 A1* | 3/2012 | Ahrari | H03F 1/3211 |
| | | | 455/341 |
| 2012/0300818 A1 | 11/2012 | Metreaud et al. | |
| 2013/0266045 A1* | 10/2013 | Lakkis | H04B 1/30 |
| | | | 375/219 |
| 2013/0272175 A1 | 10/2013 | Zargari et al. | |
| 2014/0269863 A1 | 9/2014 | Fan et al. | |
| 2015/0118980 A1 | 4/2015 | Leung et al. | |
| 2015/0333850 A1 | 11/2015 | Myoung et al. | |
| 2016/0087784 A1 | 3/2016 | Lin | |

OTHER PUBLICATIONS

Jayasuriya et al. "A Baseband Technique for Automated LO Leakage Suppression Achieving <-80dBm in Wideband Passive Mixer-First Receivers" IEEE, 2014, 4 pages.

Lanschutzer et al. "Integrated Adaptive LO Leakage Cancellation for W-CDMA Direct Upconversion Transmitters" 2003 IEEE Radio Frequency Integrated Circuits Symposium, 4 pages.

* cited by examiner

APPARATUS AND METHODS FOR COMPENSATING RADIO FREQUENCY TRANSMITTERS FOR LOCAL OSCILLATOR LEAKAGE

FIELD OF THE DISCLOSURE

Embodiments of the invention relate to electronic systems, and more particularly, to radio frequency electronics.

BACKGROUND

Transceivers are used in radio frequency (RF) communication systems to transmit and receive signals associated with a wide variety of communication technologies, such as cellular and/or wireless local area network (WLAN) communications.

Examples of RF communication systems with one or more transceivers include, but are not limited to, base stations, mobile devices (for instance, smartphones or handsets), laptop computers, tablets, and wearable electronics.

To improve a transceiver's performance, the transceiver can be calibrated to compensate for impairments. Calibrating the transceiver in this manner can decrease error vector magnitude (EVM), reduce out of band emissions, and/or otherwise enhance the performance of the transceiver.

SUMMARY OF THE DISCLOSURE

Apparatus and methods for compensating radio frequency (RF) transmitters for local oscillator (LO) leakage are provided herein. In certain configurations herein, a transmitter generates an RF transmit signal based on mixing an input signal with an LO signal. Additionally, the transmitter is calibrated to compensate for LO leakage, which provides a number of benefits, including lower levels of undesired emissions from the transmitter.

In one aspect, a radio frequency (RF) transmitter with local oscillator (LO) leakage compensation is provided. The RF transmitter includes a mixer including a signal input configured to receive an input signal, a clock input configured to receive an LO signal, and an output configured to generate an RF output signal. The RF transmitter further includes an LO leakage compensation circuit configured to obtain a first envelope measurement indicating a signal envelope at the output based on injecting a first DC input signal into the signal input, and to obtain a second envelope measurement indicating the signal envelope at the output based on injecting a second DC input signal into the signal input. The LO leakage compensation circuit is further configured to detect an amount of LO leakage of the mixer based on the first envelope measurement and the second envelope measurement.

In some embodiments, the first DC input signal and second DC input signal have about equal magnitude but opposite polarity. In certain implementations, the first DC input signal and second DC input signal are DC input currents.

In various embodiments, the first envelope measurement and the second envelope measurement are each a DC measurement.

In a number of embodiments, the LO leakage compensation circuit is further configured to detect the amount of LO leakage based on determining a difference between the first envelope measurement and the second envelope measurement, and to provide LO leakage compensation based on the difference.

In several embodiments, the LO leakage compensation circuit is further configured to detect the amount of LO leakage based on comparing the first envelope measurement and the second envelope measurement, and iteratively adjusting a magnitude of the first DC input signal and the second DC input signal based on the comparison until the first envelope measurement and the second envelope measurement are substantially equal.

According to a number of embodiments, the LO leakage compensation circuit includes an envelope detector configured to obtain the first envelope measurement and the second envelope measurement, and an ADC configured to generate a digital representation of the first envelope measurement and a digital representation of the second envelope measurement.

In some embodiments, the LO leakage compensation circuit further includes a digital subtractor configured to compute a difference between the digital representation of the first envelope measurement and the digital representation of the second envelope measurement.

In accordance with several embodiments, the LO leakage compensation circuit further includes a digital comparator configured to compare the first envelope measurement and to the second envelope measurement, and to control an input offset to the mixer based on the comparison.

In a number of embodiments, the RF transmitter further includes an RF amplifier electrically connected between the output of the mixer and an input to the envelope detector.

In another aspect, a method of compensating a transmitter for LO leakage is provided. The method includes receiving an LO signal as a clock input to a mixer, injecting a first DC input signal into a signal input of the mixer, obtaining a first envelope measurement indicating an output signal envelope of the mixer in response to the first DC input signal, injecting a second DC signal into the signal input of the mixer, obtaining a second envelope measurement indicating the output signal envelope of the mixer in response to the second DC input signal, and detecting an amount of LO leakage of the mixer based on the first envelope measurement and the second envelope measurement.

In several embodiments, the first DC input signal and second DC input signal have about equal magnitude but opposite polarity.

In a number of embodiments, detecting the amount of LO leakage further includes determining the difference between the first envelope measurement and the second envelope measurement, and providing LO leakage compensation based on the difference.

In some embodiments, detecting the amount of LO leakage further includes comparing the first envelope measurement and the second envelope measurement, and iteratively adjusting a magnitude of the first DC input signal and the second DC input signal based on the comparison until the first envelope measurement and the second envelope measurement are substantially equal.

In another aspect, an RF communication system is provided. The RF communication system includes a power amplifier configured to provide amplification to an RF signal, and a transceiver die configured to generate the RF signal. The transceiver die includes an LO configured to generate an LO signal, a mixer, and an LO leakage compensation circuit. The mixer includes a signal input configured to receive an input signal, a clock input configured to receive the LO signal, and an output configured to control the RF signal. The LO leakage compensation circuit is configured to obtain a first envelope measurement indicating a signal envelope at the output of the mixer based on injecting a first DC input signal into the signal input, and to obtain a second envelope measurement indicating the signal envelope at the output of the mixer based on injecting a second DC input signal into the signal input. The LO leakage compensation circuit is further configured to detect an amount of LO leakage of the mixer based on the first envelope measurement and the second envelope measurement.

In various embodiments, the first DC input signal and second DC input signal have about equal magnitude but opposite polarity.

In a number of embodiments, the LO leakage compensation circuit is further configured to detect the amount of LO leakage based on determining a difference between the first envelope measurement and the second envelope measurement.

In several embodiments, the LO leakage compensation circuit is further configured to detect the amount of LO leakage based on comparing the first envelope measurement to the second envelope measurement.

In accordance with certain embodiments, the LO leakage compensation circuit is further configured to compensate for LO leakage by controlling an input offset to the mixer based on the amount of LO leakage detected.

In some embodiments, the LO leakage compensation circuit includes an envelope detector configured to output the first envelope measurement and the second envelope measurement as DC measurements.

According to various embodiments, the LO leakage compensation circuit includes a DAC configured to inject the first DC input signal and to inject the second DC input signal.

DETAILED DESCRIPTION OF EMBODIMENTS

Figure 1A:
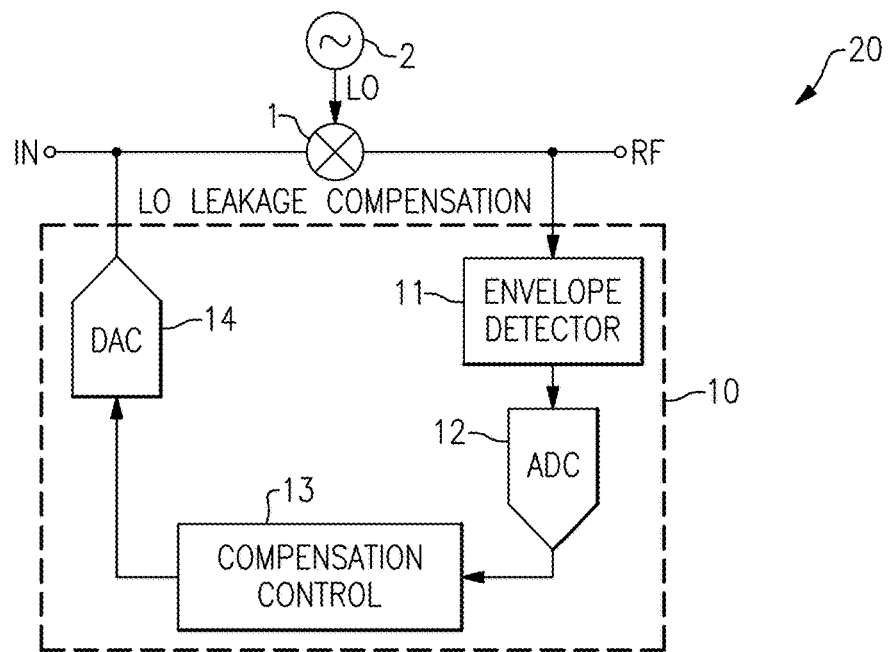
FIG. 1A is a schematic diagram of one embodiment of a radio frequency (RF) system with local oscillator (LO) leakage compensation.

The following detailed description of embodiments presents various descriptions of specific embodiments of the invention. In this description, reference is made to the drawings in which like reference numerals may indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A transceiver includes a transmitter for transmitting radio frequency (RF) signals and a receiver for receiving RF signals. Additionally, the transceiver's transmitter can be calibrated to compensate for transmit impairments.

One such transmitter impairment is local oscillator (LO) leakage, in which a portion of an LO signal used for mixing appears at the transmitter's output. LO leakage can arise from finite isolation between a clock terminal of a mixer and a signal terminal of the mixer. Absent correction or calibration, the LO leakage can lead to failure of tests monitoring for undesired emissions.

For example, LO leakage can be present at frequencies having specified limits on undesired emissions from the transmitter. Thus, LO leakage can limit transmitter performance in applications having relatively stringent emissions specifications.

To reduce or limit such undesired emissions, the transmitter can be calibrated to reduce the level of LO leakage.

Apparatus and methods for compensating RF transmitters for LO leakage are provided herein. In certain configurations, an RF communication system includes a mixer including a signal input that receives an input signal, a clock input that receives an LO signal, and an output that generates an RF output signal. The RF communication system further includes an LO leakage compensation circuit that obtains a first envelope measurement indicating a signal envelope at the output based on injecting a first DC input signal into the signal input, and that obtains a second envelope measurement indicating the signal envelope at the output based on injecting a second DC input signal into the signal input. Additionally, the LO leakage compensation circuit detects an amount of LO leakage of the mixer based on the first envelope measurement and the second envelope measurement. In certain implementations, the detected amount of LO leakage is determined based on a difference between the first envelope measurement and the second envelope measurement.

Accordingly, LO leakage of a transmitter's mixer can be detected based on injecting DC input signals of different values, obtaining measurements of the corresponding output signal envelopes, and detecting the amount of LO leakage based on the envelope measurements. Additionally, the transmitter can be calibrated based on the detected amount of LO leakage, such as by adding an appropriate DC offset to the input signal to thereby achieve nulling or cancelling of the LO leakage.

In certain implementations, the injected DC input signals correspond to injected DC input currents, such as a pair of DC input currents of about equal magnitude but opposite polarities. Additionally, the LO leakage compensation circuit can include one or more DACs or other circuitry suitable for injecting DC input signals into the signal input of the mixer. In one embodiment, the LO leakage compensation circuit injects a square wave into the mixer's signal input, and the square wave toggles between a first input signal level and a second input signal level at which the envelope measurements are obtained.

By using DC input signals for detecting LO leakage, reduced circuit complexity can be achieved relative to a configuration in which LO leakage is detected based on injecting a sinusoidal wave.

In certain implementations, the LO leakage compensation circuit includes an envelope detector that generates a DC output indicating the measured output signal envelope. In such implementations, LO leakage detection can be achieved based on a difference between DC measurements. For example, the difference between a first DC measurement and a second DC measurement can represent an offset sufficient to provide LO leakage compensation. Thus, LO leakage detection can be achieved with less area, complexity, and/or power consumption relative to LO leakage compensation schemes that compute Fourier transforms of an RF output signal.

Using an envelope detector can provide enhanced performance relative to an implementation in which an RF output signal is downconverted by a mixer of an observation receiver. For example, detecting LO leakage with an observation receiver can suffer from ambiguity between LO leakage associated with the mixer in the transmit signal path and LO leakage associated with the mixer in the observation path.

In certain implementations, the LO leakage compensation circuit selects or chooses an appropriate correction level or setting for nulling the LO leakage based on the difference between the envelope signal measurements. In one embodiment, the same circuitry (for instance, one or more DACs) used for injecting the DC input signals are also used to provide a DC offset that compensates the RF transmitter for LO leakage. However, other implementations are possible. For instance, in another implementation, the baseband in-phase (I) and baseband quadrature-phase (Q) paths of an RF transmitter include digital adders used for adding an appropriate DC offset based on the detected LO leakage to the I and Q paths of the RF transmitter, thereby compensating for LO leakage.

The LO leakage compensation circuits herein can calibrate a transmitter to compensate for LO leakage at a wide variety of times. In one example, calibration to compensate for LO leakage is performed on-chip during a calibration cycle. In another example, calibration is performed during manufacture and testing, and calibration data suitable for nulling LO leakage is stored by programming fuses, a memory, and/or other suitable storage elements.

FIG. 1A is a schematic diagram of one embodiment of an RF system 20 with LO leakage compensation. The RF system 20 includes a mixer 1, an LO 2, and an LO leakage compensation circuit 10. Although not illustrated in FIG. 1A, the RF system 20 can include additional circuitry and/or other structures that have been omitted for clarity of the figures. For example, the mixer 1 represents a portion of a transmitter's transmit signal path, and the transmitter can include a wide variety of additional circuitry and components.

The LO leakage compensation circuit 10 includes an envelope detector 11, an analog-to-digital converter (ADC) 12, a compensation control circuit 13, and a digital-to-analog converter (DAC) 14. Although one embodiment of an LO leakage compensation circuit is shown in FIG. 1A, the teachings herein are applicable to LO leakage compensation circuits implemented in a wide variety of ways.

As shown in FIG. 1A, the mixer 1 includes a clock input that receives an LO signal from the LO 2. The mixer 1 further includes a signal input that receives an input signal (IN), and an output that generates an RF output signal (RF).

The RF system 20 includes the LO 2, which can be implemented in a wide variety of ways. In one embodiment, the LO 2 includes a phase-locked loop (PLL) or other suitable frequency synthesizer.

Absent compensation, LO leakage can degrade the spectral purity of the RF output signal and/or lead to the RF system 20 failing tests for undesired emissions. The LO leakage can arise from finite isolation between the clock input of the mixer 1 and the signal input and/or output of the mixer 1.

The LO leakage compensation circuit 10 of FIG. 1A operates to both detect and correct for LO leakage to provide calibration that compensates the mixer 1 for LO leakage. Although the LO leakage compensation circuit 10 of FIG. 1A illustrates one embodiment of an LO leakage compensation circuit that provides compensation for LO leakage, the teachings herein are applicable to LO leakage compensation circuits implemented in a wide variety of ways. Accordingly, other implementations are possible.

When detecting for LO leakage, the compensation control circuit 13 controls the DAC 14 to inject a first DC input signal into the signal input of the mixer 1, and the envelope detector 11 generates a first envelope measurement indicating an output signal envelope of the RF output signal in response to the first DC input signal. The first envelope measurement is quantized by the ADC 12, and processed by the compensation control circuit 13. Additionally, the compensation control circuit 13 controls the DAC 14 to inject a second DC input signal into the signal input of the mixer 1, and the envelope detector 11 generates a second envelope measurement indicating the output signal envelope of the RF output signal in response to the second DC input signal. The compensation control circuit 13 detects an amount of LO leakage present based on the first envelope measurement and the second envelope measurement.

In one embodiment, LO leakage is detected by injecting DC input signals of different values, obtaining corresponding envelope measurements of the RF output signal, and detecting the amount of LO leakage based on the difference between the envelope measurements. In certain implementations, the injected DC input signals correspond to injected DC input currents, such as a pair of DC input currents of about equal magnitude but opposite polarity. By using DC input signals for detecting LO leakage, reduced circuit complexity can be achieved relative to a configuration in which LO leakage is detected based on injecting a sinusoidal wave of a particular frequency. Furthermore, such a measurement scheme avoids ambiguity in loop polarity.

In certain implementations, the envelope detector 11 generates a DC output signal indicating the measured envelope of the RF output signal. The DC envelope measurement can represent a wide variety of characteristics of the envelope of the RF output signal, including, but not limited to, the envelope's peak, the envelope's square, the envelope's root-mean-square (RMS) value, and/or the envelope's average. Additionally, LO leakage detection can be achieved based on a difference between DC envelope measurements. For example, the compensation control circuit 13 can include a digital subtractor that computes a difference between a digital representation of a first DC envelope measurement and a digital representation of a second DC envelope measurement.

Thus, LO leakage detection can be achieved with less area, complexity, and/or power consumption relative to certain other LO leakage detection schemes, such as those detecting LO leakage by computing Fourier transforms of an RF output signal.

Accordingly, when detecting for LO leakage, the LO leakage compensation circuit 10 is operable to detect LO leakage based on a first envelope measurement observed in response to injecting a first DC input signal and a second envelope measurement observed in response to injecting a second DC input signal.

Once the amount of LO leakage present has been detected, the compensation control circuit 13 controls compensation or nulling of the LO leakage, thereby calibrating the RF system 20. In one example, the compensation control circuit 13 can control the DAC 14 based on the detected LO leakage to provide a DC offset to the input signal to thereby achieve LO leakage nulling.

For example, in one embodiment, prior to compensation the RF output signal of the mixer 1 is about equal to IN×LO+$LO_{LK}$, where IN is the input signal to the mixer 1, LO is the local oscillator signal to the mixer 1, and $LO_{LK}$ is the LO leakage of the mixer 1. Additionally, when a DC offset $DC_{OFF}$ is also provided to the input of the mixer 1, the RF output signal of the mixer 1 is about equal to IN×LO+$LO_{LK}$+$DC_{OFF}$×LO. Thus, a suitable DC offset $DC_{OFF}$ can be selected for cancelling the LO leakage $LO_{LK}$.

Accordingly, the DAC 14 can be used both for DC signal injection to detect LO leakage and for generating a DC offset to provide compensation for LO leakage. However, other implementations are possible. For instance, in another example, a digital adder is included in the baseband signal path, and an appropriate DC offset based on the detected LO leakage is digitally added to compensate for LO leakage.

Although not illustrated in FIG. 1A, the LO leakage compensation circuit 10 can receive a calibration signal for initiating calibration to detect and correct for LO leakage. The calibration signal can be activated at any suitable time, such as during an on-chip calibration cycle and/or during factory manufacture or test.

Figure 1B:
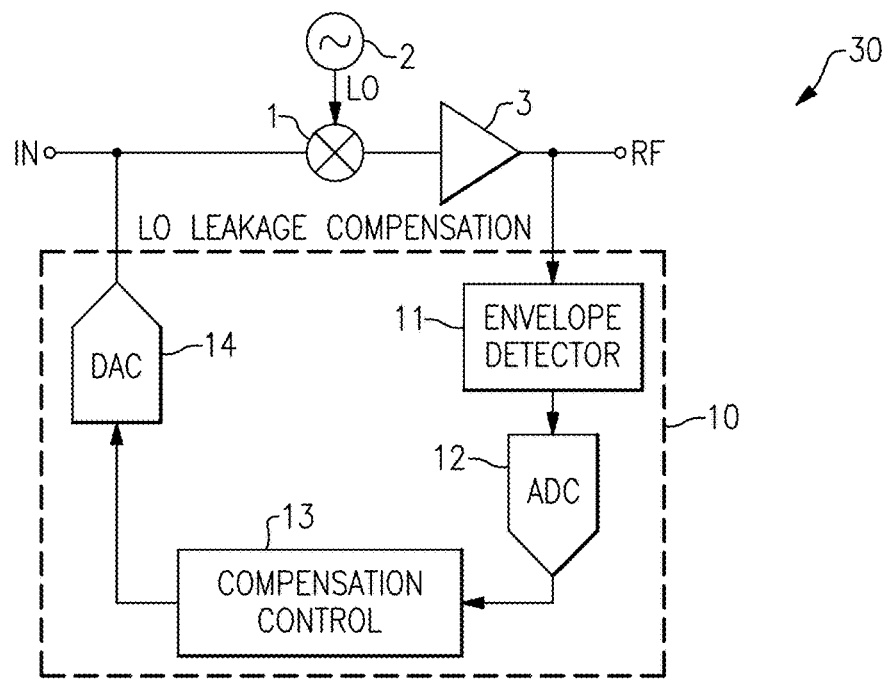
FIG. 1B is a schematic diagram of another embodiment of an RF system with LO leakage compensation.

FIG. 1B is a schematic diagram of another embodiment of an RF system 30 with LO leakage compensation. The RF system 30 includes a mixer 1, an LO 2, an RF amplifier 3, and an LO leakage compensation circuit 10.

The RF system 30 of FIG. 1B is similar to the RF system 20 of FIG. 1A, except that the RF system 30 of FIG. 1B further includes the RF amplifier 3 between the output of the mixer 1 and the input of the envelope detector 11. Including one or more RF amplifiers at the output of the mixer 1 can aid in providing suitable drive strength and/or in generating an output signal envelope that is sufficiently large for measurement or detection.

In certain implementations, the LO leakage compensation circuit 10 selects or chooses an appropriate correction level or setting for nulling the LO leakage based on the difference between envelope signal measurements detected in response to DC input currents of about equal magnitude but opposite polarity.

For example, in one embodiment, in response to a first DC input current $I_{dc}$, the RF output signal can have a value of about $(I_{dc}+I_{off})\times G$, where $I_{off}$ is an input offset current of the mixer 1, and G is a combined conversion gain of the mixer 1 and the RF amplifier 3. Additionally, in response to a second DC input current $-I_{dc}$, the RF output signal can have a value of about $(-I_{dc}+I_{off})\times G$. Furthermore, the first envelope measurement in response to the first DC input current $I_{dc}$ can be about equal to $K\times(I_{dc}+I_{off})^2\times G^2$, where K is a gain of the envelope detector 11. Additionally, the envelope of the RF output signal in response to the second DC input current $-I_{dc}$ can be about equal to $K\times(-I_{dc}+I_{off})^2\times G^2$.

Thus, the difference between the envelope measurements $\Delta ENV$ can be about equal to $4KG^2I_{dc}I_{off}$. According, a suitable input offset current $I_{off}$ for nulling or compensating for LO leakage can be about equal to $\Delta ENV/(4KG^2I_{dc})$.

In certain implementations, the LO leakage compensation circuit 10 detects the amount of LO leakage based on scaling the difference between the envelope measurements to determine a DC offset suitable for providing LO nulling. For instance, in the example described above, the input offset current $I_{off}$ for providing LO nulling can be selected to be about equal to $\Delta ENV/(4KG^2I_{dc})$.

An LO leakage compensation circuit that scales the difference between envelope measurements to determine an input offset suitable for compensating for LO leakage is also referred to herein as providing open-loop compensation. When providing open-loop compensation for LO leakage, the appropriate value for scaling can be obtained in a variety of ways, such as by determining the appropriate scalar based on design and/or measurement. By providing open-loop compensation, compensation for LO leakage can be achieved with a relatively short calibration time.

In other implementations, the LO leakage compensation circuit 10 detects the amount of LO leakage based on an iterative process. In one example, the LO leakage compensation circuit 10 is operable to compare envelope signal measurements in response to DC input currents of about equal magnitude but opposite polarity, to change the magnitude of the DC input currents (for instance, increase or decrease) based on the comparison, and to iterate until the envelope signal measurements are about equal to one another.

An LO leakage compensation circuit that compensates for LO leakage by an iterative process is referred to herein as providing closed-loop compensation for LO leakage. LO leakage compensation circuits that operate with closed-loop compensation can provide LO nulling without needing to scale the difference between envelope signal measurements, and thus can operate without knowledge of values of circuit block parameters, such as gains.

Figure 2A:
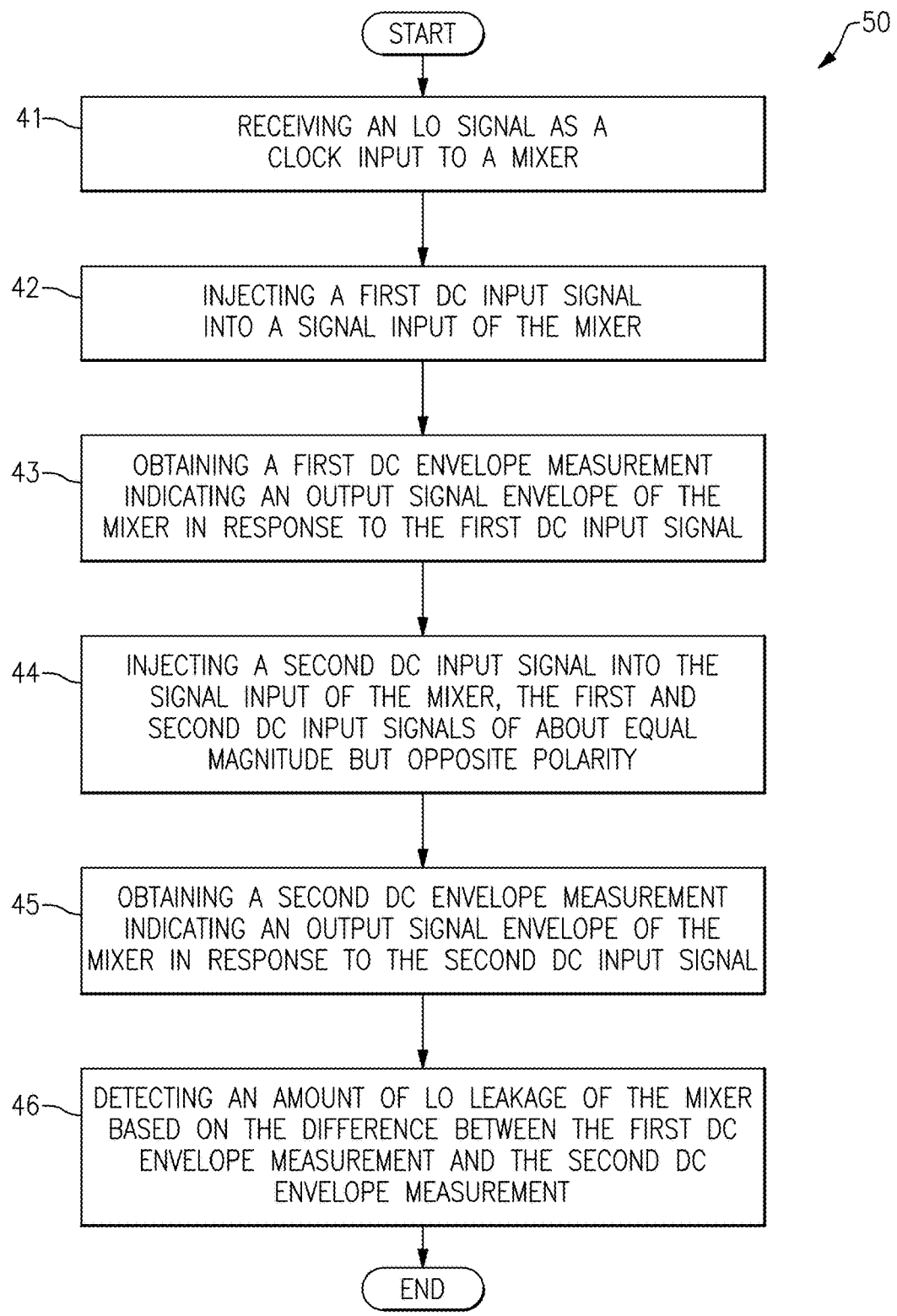
FIG. 2A is a diagram of a method of open-loop LO leakage compensation according to one embodiment.

FIG. 2A is a diagram of a method 50 of open-loop LO leakage compensation according to one embodiment. The method 50 can be realized using any of the LO leakage circuits described herein.

The method 50 begins at a block 41, in which an LO signal is received as a clock input to a mixer.

In an ensuing block 42, a first DC input signal is injected into a signal input of the mixer. The first DC input signal can be injected in a variety of ways, such as by using a DAC. In certain implementations, the first DC input signal is a DC input current.

The method 50 continues to a block 43, in which a first DC envelope measurement is obtained. The first DC envelope measurement indicates an output signal envelope of the mixer in response to the first DC input signal. The DC envelope measurement can indicate a wide variety of characteristics of the output signal envelope, such as peak value, square value, RMS value, average value, and/or other suitable value of the output signal envelope. The first envelope measurement can be taken directly at the output of the mixer (for example, FIG. 1A) or downstream from the mixer (for example, FIG. 1B).

In an ensuing block 44, a second DC input signal is injected into the signal input of the mixer. The first and second DC input signals have about equal magnitude but opposite polarity. In certain implementations, the first and second DC input signals are DC input currents.

The method 50 continues at a block 45, in which a second DC envelope measurement is obtained. The second DC envelope measurement indicates the output signal envelope of the mixer in response to the second DC input signal. The second DC envelope measurement can be obtained using the same circuitry as used to obtain the first DC envelope measurement.

In certain implementations, the first DC envelope measurement and the second DC envelope measurement are converted using an ADC to generate digital representations of the DC envelope measurements. Additionally, the digital representations of the DC envelope measurements are processed using digitally circuitry, for instance, logic gates and memory elements suitable for performing digital processing.

In an ensuing block 46, an amount of LO leakage of the mixer is detected based on the difference between the first envelope measurement and the second envelope measurement. For example, in certain implementations the amount of LO leakage is directly proportional to the difference between the first DC envelope measurement and the second DC envelope measurement. Thus, the difference between the DC envelope measurements can be scaled by an appropriate factor to determine the amount of LO leakage. For instance, in the example described above with respect to FIG. 1B, the input offset current $I_{off}$ for providing LO nulling can be selected to be about equal to $\Delta ENV/(4KG^2 I_{dc})$.

The detected LO leakage can be used to select a DC input offset that nulls the LO leakage, thereby compensating the transmitter for impairments. In one example, the DC input offset is provided using the same circuitry that injects the DC input signals in block 42 and block 44. In another example, the DC input offset is digitally added via baseband processing.

Figure 2B:
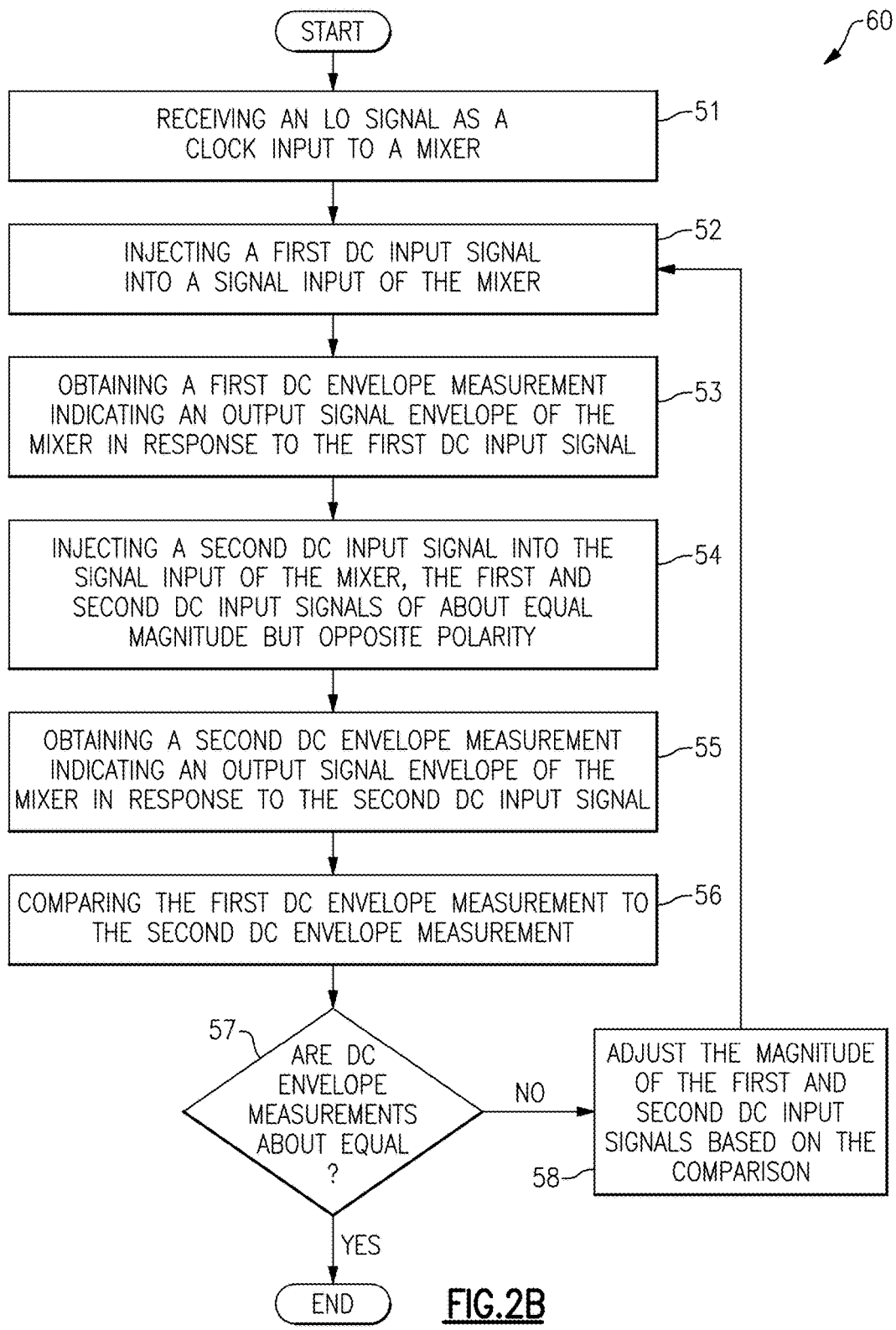
FIG. 2B is a diagram of a method of closed-loop LO leakage compensation according to one embodiment.

FIG. 2B is a diagram of a method 60 of closed-loop LO leakage compensation according to one embodiment. The method 60 can be realized using any of the LO leakage circuits described herein.

The method 60 begins at a block 51, in which an LO signal is received as a clock input to a mixer.

In an ensuing block 52, a first DC input signal is injected into a signal input of the mixer. The first DC input signal can be injected in a variety of ways, such as by using a DAC. In certain implementations, the first DC input signal is a DC input current.

The method 60 continues to a block 53, in which a first DC envelope measurement is obtained. The first DC envelope measurement indicates an output signal envelope of the mixer in response to the first DC input signal. The DC envelope measurement can indicate a wide variety of characteristics of the output signal envelope, such as peak value, square value, RMS value, average value, and/or other suitable value of the output signal envelope. The first envelope measurement can be taken directly at the output of the mixer (for example, FIG. 1A) or downstream from the mixer (for example, FIG. 1B).

In an ensuing block 54, a second DC input signal is injected into the signal input of the mixer. The first and second DC input signals have about equal magnitude but opposite polarity. In certain implementations, the first and second DC input signals are DC input currents.

The method 60 continues to a block 55, in which a second DC envelope measurement is obtained. The second DC envelope measurement indicates the output signal envelope of the mixer in response to the second DC input signal. The second DC envelope measurement can be obtained using the same circuitry as used to obtain the first DC envelope measurement.

In certain implementations, the first DC envelope measurement and the second DC envelope measurement are converted using an ADC to generate digital representations of the DC envelope measurements. Additionally, the digital representations of the DC envelope measurements are processed using digitally circuitry, for instance, logic gates and memory elements suitable for performing digital processing.

In an ensuing block 56, the first and second DC envelope measurements are compared to one another. The method 60 continues to a decision block 57, in which a determination is made as to whether or not the first DC envelope measurement and the second DC envelope measurement are about equal to one another. The method 60 ends when the measurements are about equal.

However, when the DC envelope measurements are unequal, the method 60 continues to a block 58, in which the magnitude of the first and second DC input signals is adjusted based on the comparison. For example, in an implementation in which a DAC generates the first and second DC input signals, an input to the DAC can be incremented or decremented based on whether the first DC envelope measurement or the second DC envelope measurement is larger. After the magnitude of the first and second DC input signals is suitably adjusted, the method 60 returns to block 52.

Accordingly, the method 60 iteratively adjusts the magnitude of the first and second DC input signals until the first and second DC envelope measurements are about equal to one another. When the first and second DC envelope measurements are substantially equal, the magnitude of the first and second DC input signals corresponds to the DC input offset to the mixer 1 suitable for providing nulling of LO leakage.

For example, the DC envelope measurements are about equal to one another when no LO leakage is present. For instance, a pair of measurements or readings of about 200 mV from the output of an envelope detector in response to a pair of DC input currents of +100 uA and −100 uA indicates that a DC input offset with a magnitude of about 100 uA is sufficient to provide LO nulling. However, when the two measurements are different, for instance, 210 mV and 190 mV, then LO leakage is present.

By using closed-loop LO leakage compensation, the magnitude of the injected DC input signals can be iteratively adjusted until the corresponding envelope measurements are substantially equal to another.

The resulting DC input offset is used to null the LO leakage, thereby compensating the transmitter for impairments. In one example, the DC input offset is provided using the same circuitry that injects the DC input signals in block 52 and block 54. In another example, the DC input offset is digitally added via baseband processing.

Figure 3A:
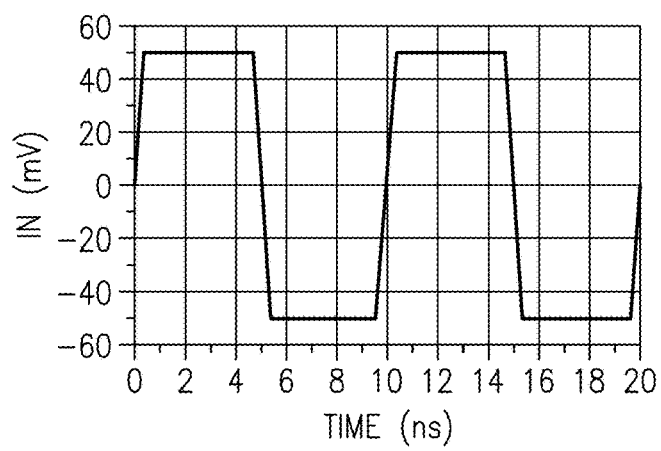
FIGS. 3A-3C illustrate simulated waveforms for one example of LO leakage compensation.
Figure 3B:
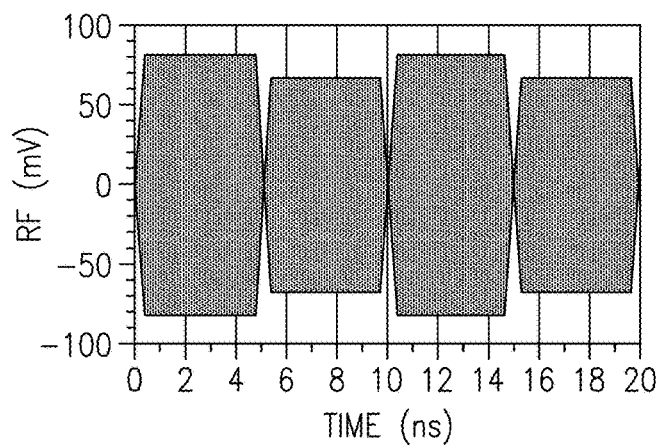
Figure 3C:
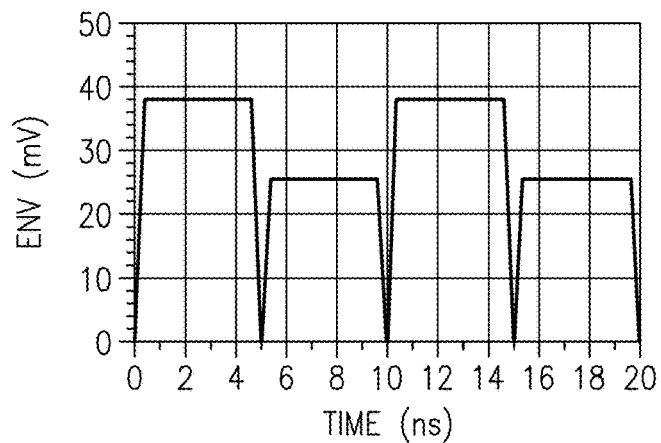

FIGS. 3A-3C illustrate simulated waveforms for one example of LO leakage compensation. The simulated waveforms correspond to simulation results for one implementation of the RF system 30 of FIG. 1B. Although one example of simulation results are shown in FIGS. 3A-3C, simulation results can vary based on a wide range of factors, such as circuit implementation, simulation parameters, models, and/or tools. Accordingly, other waveforms are possible.

FIG. 3A illustrates input voltage versus time for one example of LO leakage compensation. As shown in FIG. 3A, the input voltage corresponds to a square wave that toggles between a first DC input voltage of about 50 mV and a second DC input voltage of about −50 mV, in this example.

FIG. 3B illustrates RF output voltage versus time for one example of LO leakage compensation. As shown in FIG. 3B, the envelope of the RF output signal changes based on the DC input voltage.

FIG. 3C illustrates envelope detector output voltage versus time for one example of LO leakage compensation. As shown in FIG. 3C, the value of the measured envelope changes based on the DC input voltage. For example, when the DC input voltage is about 50 mV, the measured envelope is about 38 mV. Additionally, when the DC input voltage is about −50 mV, the measured envelope is about 25 mV. By determining the difference between the envelope measurements, the amount of LO leakage present can be determined.

Figure 4A:
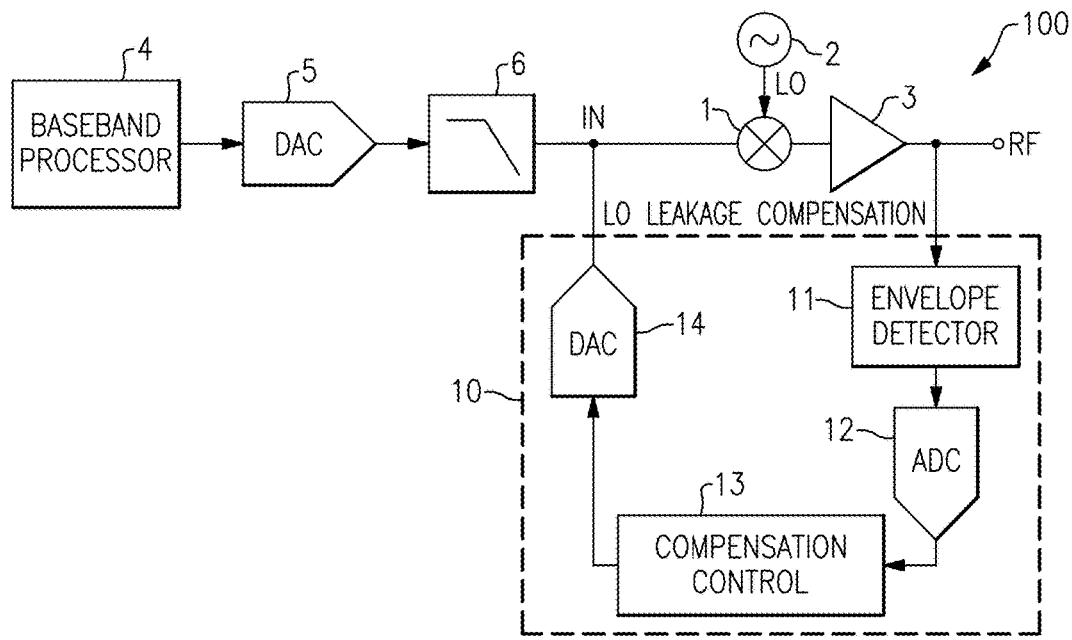
FIG. 4A is a schematic diagram of another embodiment of an RF system with LO leakage compensation.

FIG. 4A is a schematic diagram of another embodiment of an RF system 100 with LO leakage compensation. The RF system 100 includes a mixer 1, an LO 2, an RF amplifier 3, a baseband processor 4, a DAC 5, a low pass filter 6, and an LO compensation circuit 10. The RF system 100 of FIG. 4A is similar to the RF system 30 of FIG. 1B, except that the RF system 100 of FIG. 4A further includes one example of circuitry suitable for generating the input signal to the mixer 1.

As shown in FIG. 4A, the baseband processor 4 generates a digital baseband signal to the DAC 5. The DAC 5 converts the digital baseband signal to an analog baseband signal, which is filtered by the low pass filter 6 to generate the input signal to the mixer 1.

The RF system 100 illustrates one example of a direct conversion transmitter implemented with LO leakage compensation in accordance with the teachings herein. However, the teachings herein are applicable to other configurations of transmitters.

Figure 4B:
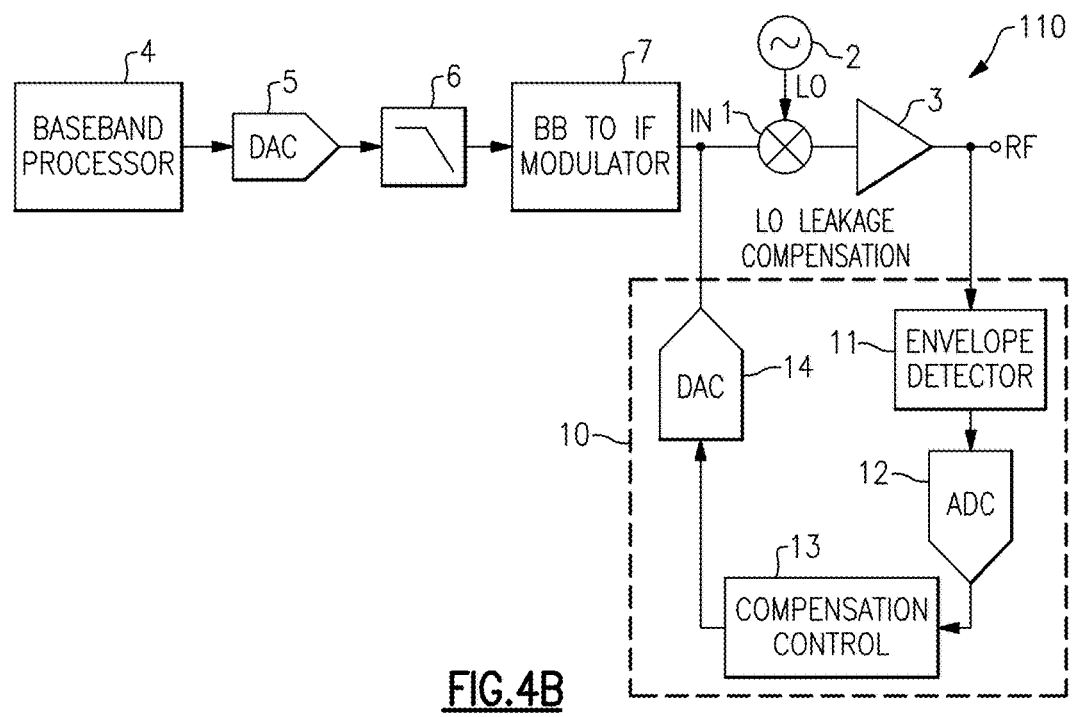
FIG. 4B is a schematic diagram of another embodiment of an RF system with LO leakage compensation.

FIG. 4B is a schematic diagram of another embodiment of an RF system 110 with LO leakage compensation. The RF system 110 includes a mixer 1, an LO 2, an RF amplifier 3, a baseband processor 4, a DAC 5, a low pass filter 6, a baseband (BB) to intermediate frequency (IF) modulator 7, and an LO compensation circuit 10. The RF system 110 of FIG. 4B is similar to the RF system 100 of FIG. 4A, except that the RF system 110 of FIG. 4B further includes the modulator 7.

As shown in FIG. 4B, the filtered analog baseband signal generated by the low pass filter 6 is upconverted by the modulator 7 to generate the input signal to the mixer 1. Thus, the input signal to the mixer 1 is an IF signal, in this example.

The RF system 110 illustrates one example of a superheterodyne transmitter implemented with LO leakage compensation in accordance with the teachings herein. However, the teachings herein are applicable to other implementations of transmitters.

Figure 4C:
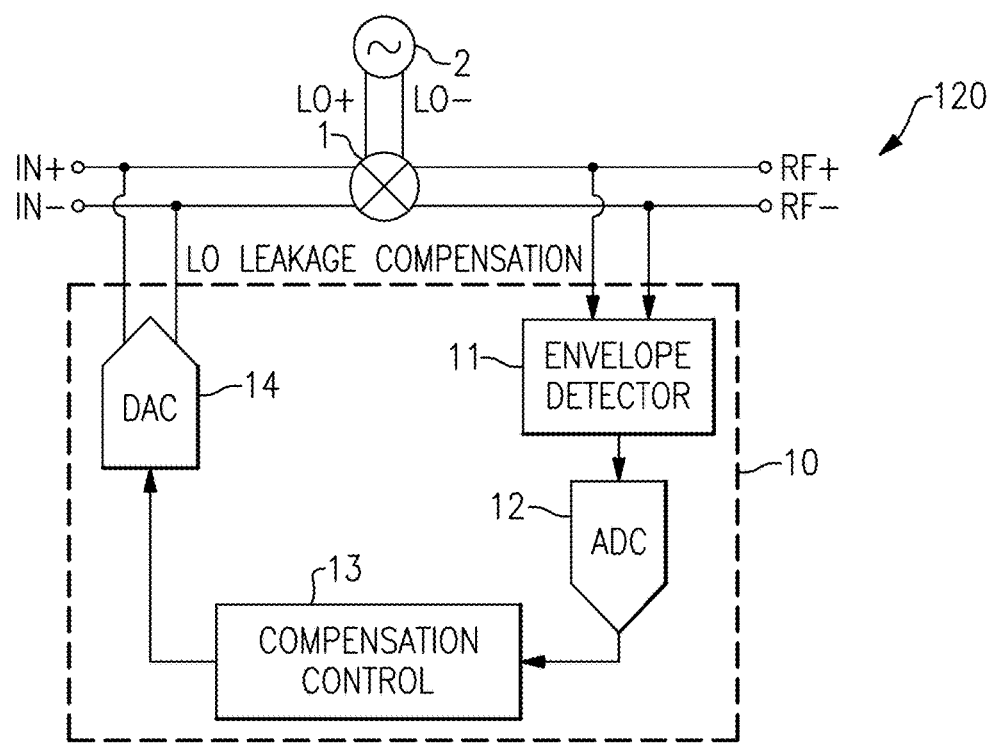
FIG. 4C is a schematic diagram of another embodiment of an RF system with LO leakage compensation.

FIG. 4C is a schematic diagram of another embodiment of an RF system 120 with LO leakage compensation. The RF system 120 of FIG. 4C is similar to the RF system 20 of FIG. 1A, except that the RF system 120 illustrates certain components and signals as operating differentially.

For example, the mixer 1 of FIG. 4C includes a differential signal input that receives a non-inverted component IN+ and an inverted component IN− of a differential input signal. Additionally, the mixer 1 further includes a differential clock input that receives a non-inverted component LO+ and an inverted component LO− of a differential LO signal from the LO 2. Furthermore, the mixer 1 further includes a differential signal output that provides a non-inverted component RF+ and an inverted component RF− of a differential RF output signal.

The teachings herein are applicable to RF systems operating using single-ended signaling, differential signaling, or a combination thereof.

Figure 4D:
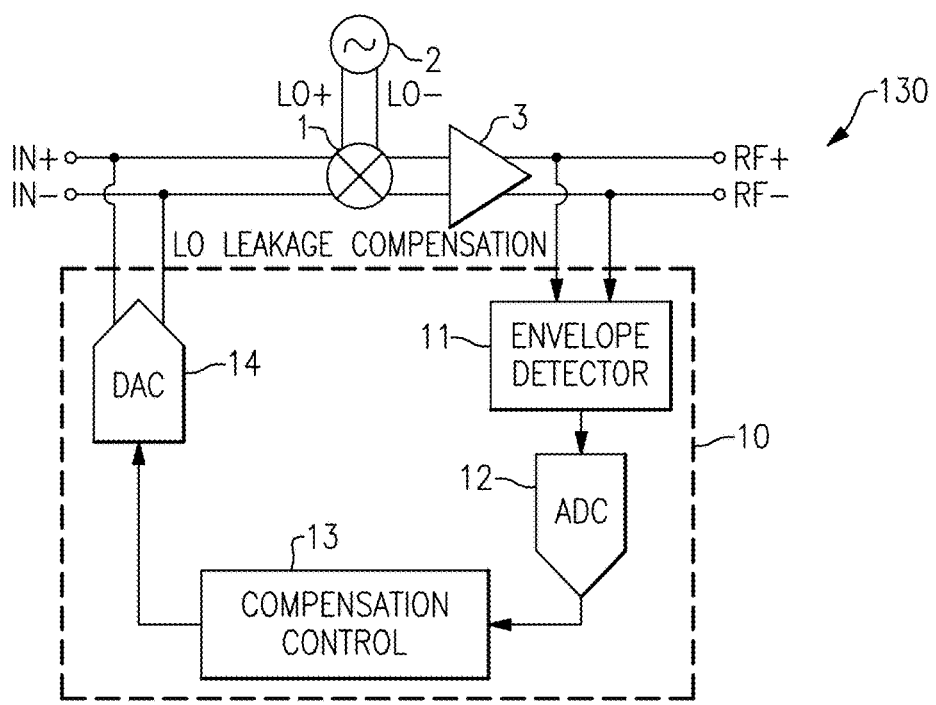
FIG. 4D is a schematic diagram of another embodiment of an RF system with LO leakage compensation.

FIG. 4D is a schematic diagram of another embodiment of an RF system 130 with LO leakage compensation. The RF system 130 of FIG. 4D is similar to the RF system 120 of FIG. 4C, except that the RF system 130 further includes an RF amplifier 3, which is implemented differentially in this embodiment.

For example, the mixer 1 of FIG. 4D includes a differential signal output that provides a differential mixer output signal to a differential signal input of the RF amplifier 3. The RF amplifier 3 amplifies the differential mixer output signal to generate a differential RF output signal that includes a non-inverted component RF+ and an inverted component RF−.

Figure 4E:
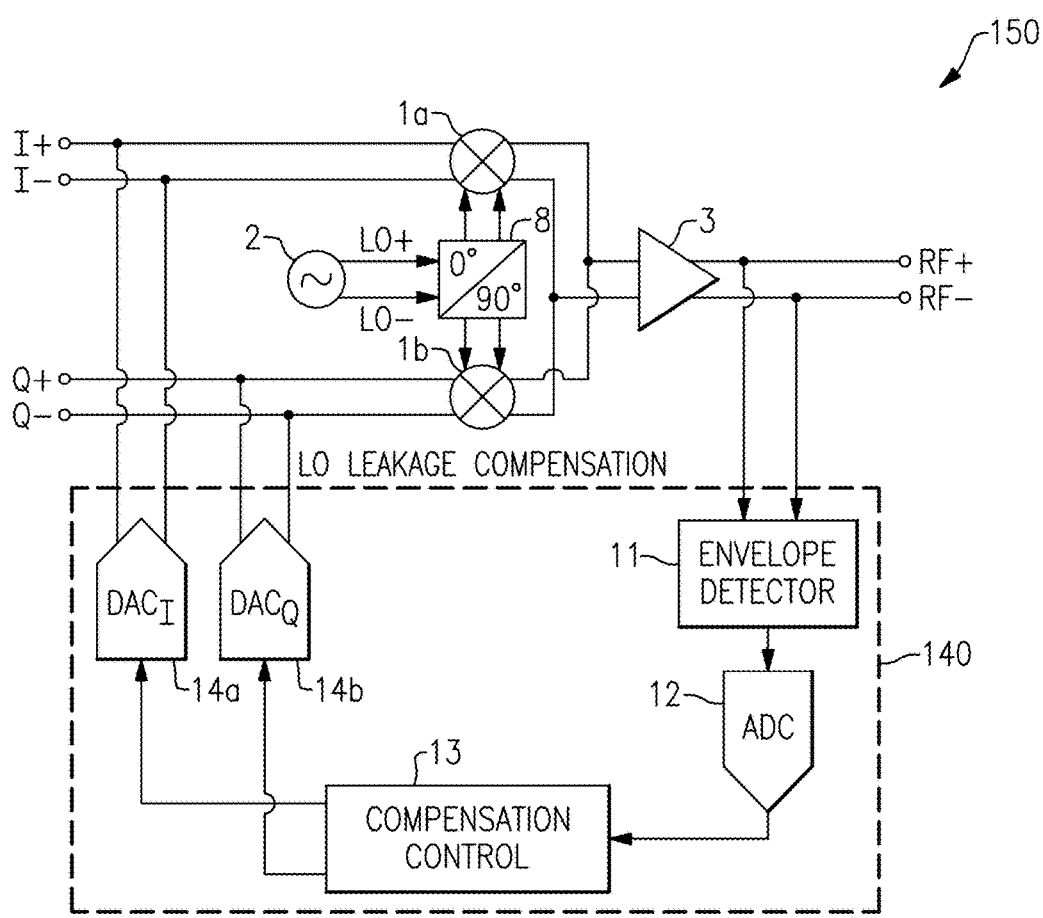
FIG. 4E is a schematic diagram of another embodiment of an RF system with LO leakage compensation.

FIG. 4E is a schematic diagram of another embodiment of an RF system 150 with LO leakage compensation. The RF system 150 includes an I-path mixer 1a, a Q-path mixer 1b, an LO 2, an RF amplifier 3, a quadrature clock signal generator 8, and an LO leakage compensation circuit 140.

The RF system 150 of FIG. 4E is similar to the RF system 130 of FIG. 4D, except that the RF system 150 is implemented as a quadrature transmitter with a separate I path and Q path. The teachings herein can be used to provide LO leakage compensation to a wide range of transmitters, including, but not limited to, quadrature transmitters including an I-path and a Q-path.

In the illustrated embodiment, the I-path mixer 1a is used to provide mixing to a differential in-phase signal including a non-inverted component I+ and an inverted component I−. Additionally, the Q-path mixer 1b is used to provide mixing to a differential quadrature-phase signal including a non-inverted component Q+ and an inverted component Q−. Furthermore, a differential output signal from the I-path mixer 1a and a differential output signal from the Q-path mixer 1b are combined and provided to a differential input of the RF amplifier 3.

In the illustrated embodiment, the quadrature clock signal generator 8 processes a differential LO signal from the LO 2 to generate a pair of differential clock signals that are about 90 degrees out-of-phase with one another. Although the illustrated example uses a quadrature clock signal generator to generate suitable clock signals for the I-path and the Q-path, the teachings herein are also applicable to quadrature transmitters that include separate LOs for the I-path and the Q-path.

As shown in FIG. 4E, the LO leakage compensation circuit 140 includes an envelope detector 11, an ADC 12, a compensation control circuit 13, an I-path DAC 14a, and a Q-path DAC 14b. Including both the I-path DAC 14a and the Q-path DAC 14b allows for LO leakage to be detected and compensated for separately in the I-path and in the Q-path. Thus, calibration can be provided for nulling LO leakage even when the amount of LO leakage is different in the I-path relative to the Q-path.

Figure 4F:
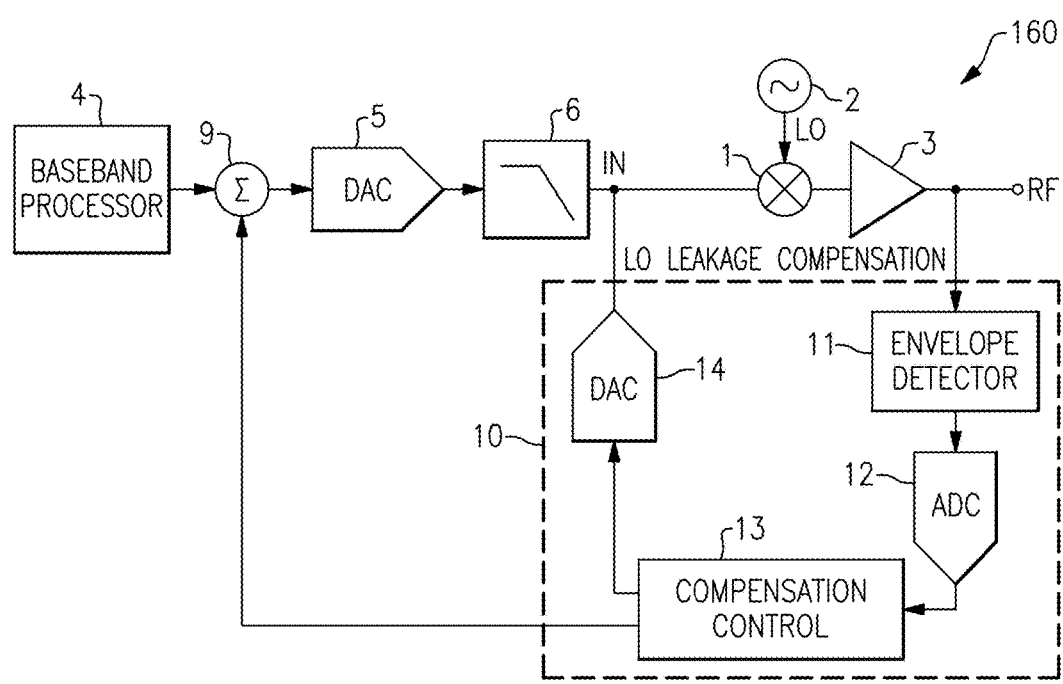
FIG. 4F is a schematic diagram of another embodiment of an RF system with LO leakage compensation.

FIG. 4F is a schematic diagram of another embodiment of an RF system 160 with LO leakage compensation. The RF system 160 of FIG. 4F is similar to the RF system 100 of FIG. 4A, except that the RF system 160 of FIG. 4F further includes a digital adder 9. As shown in FIG. 4A, the digital adder 9 is used to add a DC input offset to the signal path.

In the illustrated embodiment, the compensation control circuit 10 detects the amount of LO leakage present, and uses the detected amount of LO leakage to control the DC input offset in the signal path. Thus, the DC input offset is controlled to a value suitable for nulling LO leakage.

Although the RF system 160 includes the digital adder 9 for adding a DC input offset to a signal path, in another embodiment the digital adder 9 is omitted in favor of using the DAC 14 or other suitable circuitry for controlling the DC input offset to the mixer 1. In yet another embodiment, the RF system is adapted to include separate I and Q paths (for example, FIG. 4E), and each path includes a digital adder used for adding an appropriate DC offset based on the detected LO leakage.

Figure 5A:
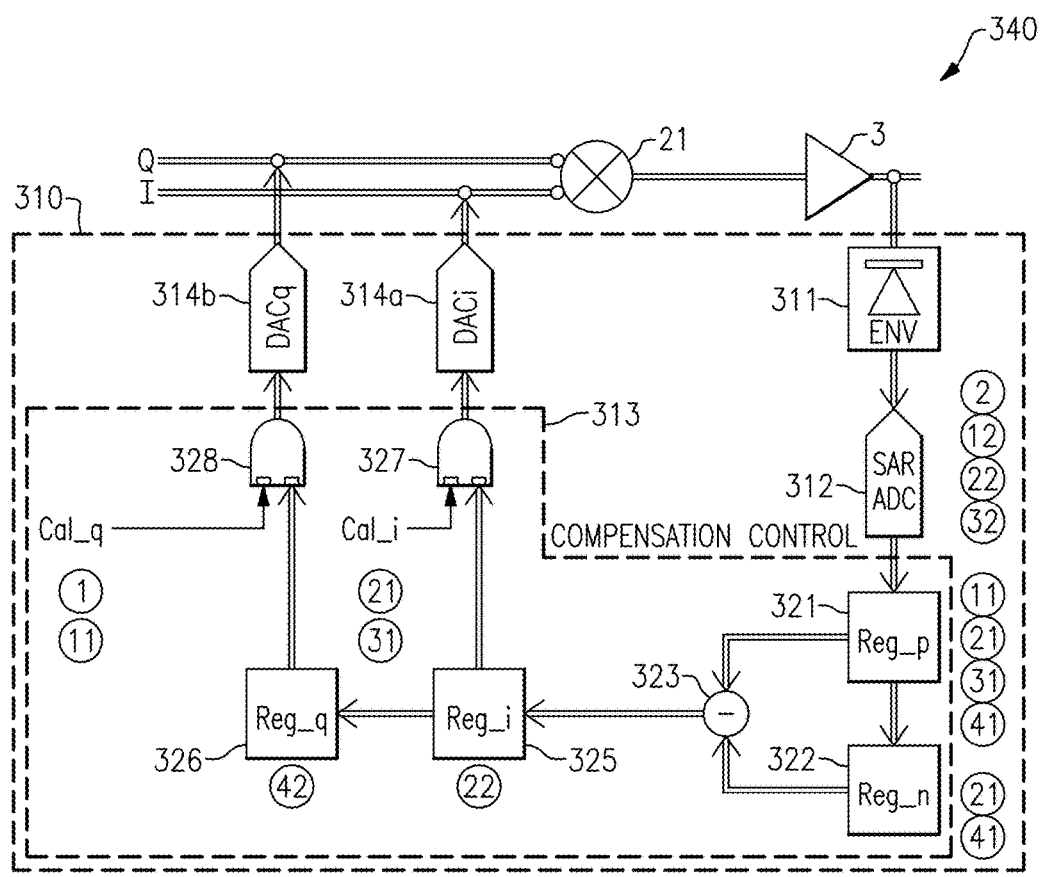
FIG. 5A is a schematic diagram of another embodiment of an RF system with LO leakage compensation.

FIG. 5A is a schematic diagram of another embodiment of an RF system 340 with LO leakage compensation. The RF system 340 includes a quadrature mixer 21, an RF amplifier 3, and an LO leakage compensation circuit 310. Although FIG. 5A illustrates an implementation with the quadrature mixer 21, in another embodiment the quadrature mixer 21 is omitted in favor of using multiple mixers (for example, the I-path mixer 1a and the Q-path mixer 1b of FIG. 4E).

The LO leakage compensation circuit 310 includes a diode-based envelope detector 311, a successive approximation (SAR) ADC 312, a compensation control circuit 313, an I-path DAC 314a, and a Q-path DAC 314b. The compensation control circuit 313 includes a first envelope measurement register 321, a second envelope measurement register 322, a digital subtractor 323, a first detected LO leakage register 325, a second detected LO leakage register 326, and logical AND gates 327, 328.

Figure 5B:
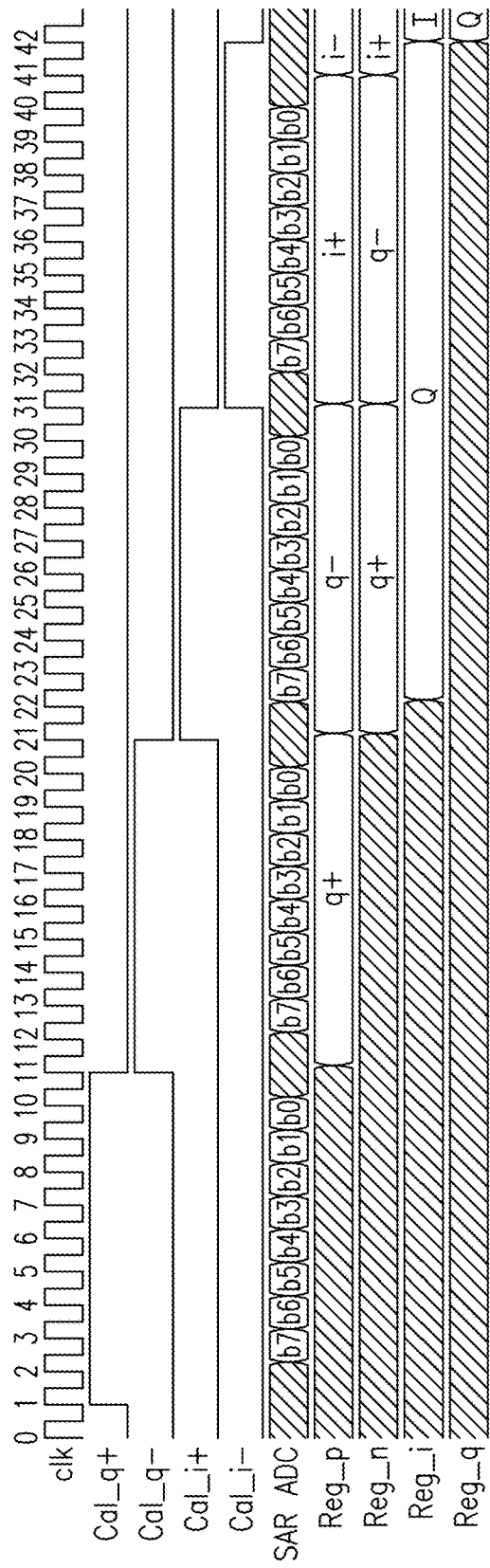
FIG. 5B is one example of a timing diagram for the RF system of FIG. 5A.

FIG. 5B is one example of a timing diagram for the RF system 340 of FIG. 5A. The timing diagram of FIG. 5B depicts one example of timing for signals clk, Cal_q+, Cal_q−, Cal_i+, Cal_i−, SAR ADC, Reg_p, Reg_n, Reg_i, and Reg_q. The cycles of the clock signal clk have been annotated in FIG. 5B beginning with cycle 0 and ended with cycle 42. Additionally, FIG. 5A has been annotated to illustrate certain clock cycles (depicted with a circled clock cycle number) associated with transitions of the signals depicted in FIG. 5B. Signal clk corresponds to a clock signal used to control timing of LO leakage compensation circuit 310 (for instance, for clocking of registers and data converters), signal Reg_p corresponds to the output signal of the first envelope measurement register 321, signal Reg_n corresponds to the output signal of the second envelope measurement register 322, signal Reg_i corresponds to the output signal of the first detected LO leakage register 325, signal Reg_q corresponds to the output signal of the second detected LO leakage register 326, and signal SAR ADC corresponds to the output signal of the SAR ADC 312. Although not shown in FIG. 5A, the signal Cal_q of FIG. 5A is asserted when either Cal_q+ or Cal_q− is active, and signal Cal_i is asserted when either Cal_i+ or Cal_i− is asserted.

With continuing reference to FIGS. 5A and 5B, when the signal Cal_q+ is active, the Q-path DAC 314b injects a DC input current $I_{DC}$ into the Q-path input to the quadrature mixer 21. Additionally, a first envelope measurement in response to the DC input current $I_{DC}$ is stored in the first envelope measurement register 321. Additionally, when the signal Cal_q− is active, the Q-path DAC 314b injects a DC input current $-I_{DC}$ into the Q-path input to the quadrature mixer 21. Additionally, a second envelope measurement in response to the DC input current $-I_{DC}$ is stored in the first envelope measurement register 321, and the first envelope measurement is shifted to the second envelope measurement register 322. Furthermore, the digital subtractor 323 determines a Q-path envelope difference based on subtracting the first envelope measurement and the second envelope measurement, and the Q-path envelope difference is stored in the first detected LO leakage register 325.

In the illustrated embodiment, when the signal Cal_i+ is active, the I-path DAC 314a injects a DC input current $I_{DC}$ into the I-path input to the quadrature mixer 21. Additionally, a first envelope measurement in response to the DC input current $I_{DC}$ is stored in the first envelope measurement register 321. Additionally, when the signal Cal_i− is active, the I-path DAC 314a injects a DC input current $-I_DC$ into the I-path input to the quadrature mixer 21. Additionally, a second envelope measurement in response to the DC input current $-I_{DC}$ is stored in the first envelope measurement register 321, and the first envelope measurement is shifted to the second envelope measurement register 322. Furthermore, the digital subtractor 323 determines an I-path envelope difference based on subtracting the first envelope measurement and the second envelope measurement. The I-path envelope difference is stored in the first detected LO leakage register 325, and the Q-path envelope difference is shifted to the second detected LO leakage register 326.

Thus, the LO leakage compensation circuit 310 operates to detect the amount of LO leakage present in the I-path and in the Q-path, and to store digital data indicating the detected LO leakages in the first and second detected LO leakage register 325, 326. In certain implementations, the compensation control circuit 313 is further configured to scale the I-path envelope difference and the Q-path envelope difference, such as by shifting bits of the detected LO leakage register 325, 326 and/or using digital logic to provide scaling. Once the amount of LO leakage present has been detected, the I-path DAC 314a and the Q-path DAC 314b operate to provide nulling of the LO leakage in the I-path and the Q-path, respectively, of the RF system 340.

The RF system 340 illustrates one embodiment of an RF system with open-loop LO leakage compensation. However, the teachings herein are applicable to other implementations of LO leakage compensation.

Figure 6:
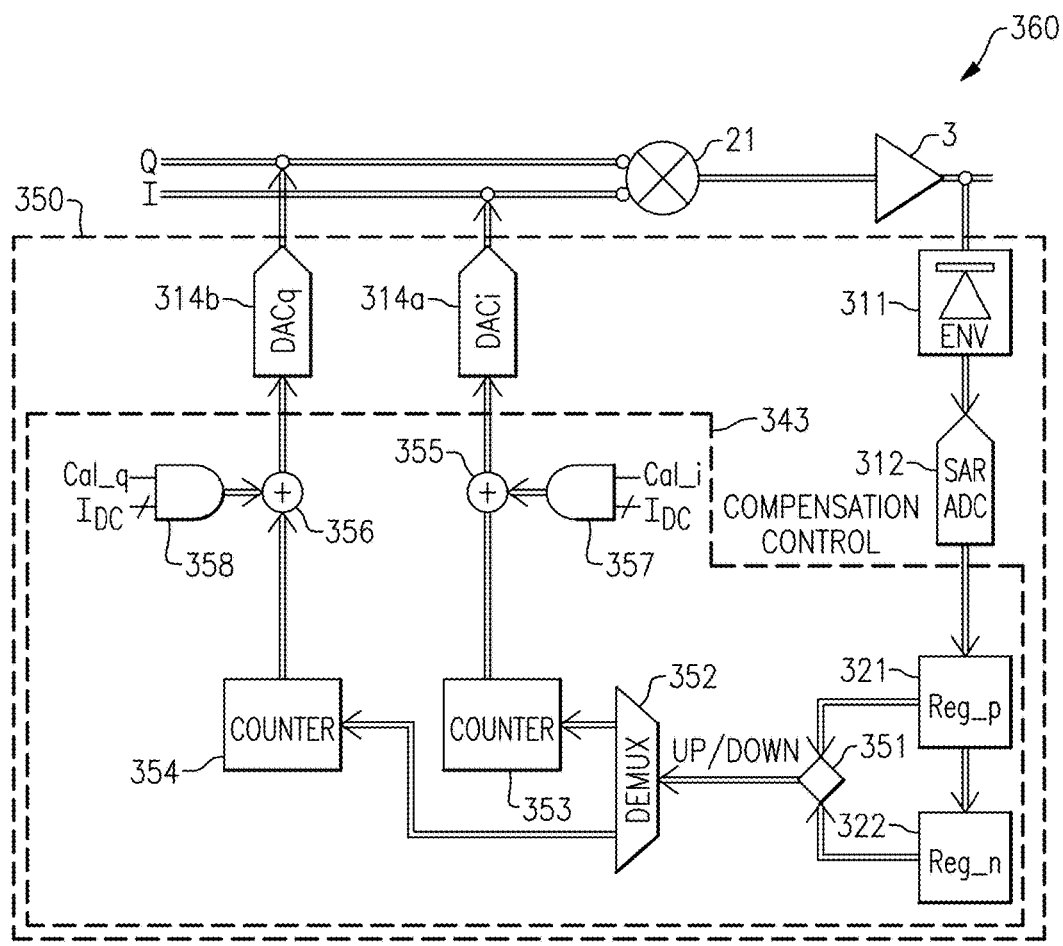
FIG. 6 is a schematic diagram of another embodiment of an RF system with LO leakage compensation.

FIG. 6 is a schematic diagram of another embodiment of an RF system 360 with LO leakage compensation. The RF system 360 includes a quadrature mixer 21, an RF amplifier 3, and an LO leakage compensation circuit 350. The LO leakage compensation circuit 350 includes a diode-based envelope detector 311, a SAR ADC 312, a compensation control circuit 343, an I-path DAC 314a, and a Q-path DAC 314b. The compensation control circuit 343 includes a first envelope measurement register 321, a second envelope measurement register 322, a digital comparator 351, a de-multiplexer 352, a first counter 353, a second counter 354, a first adder 355, a second adder 356, and logical AND gates 357, 358.

The LO leakage compensation circuit 350 operates iteratively to provide closed-loop LO leakage compensation. For example, the LO leakage compensation circuit 350 operates to store a first envelope measurement in response to a first DC input current $I_{DC}$ in the first envelope measurement register 321, and to store a second envelope measurement in response to a second DC input current $-I_{DC}$ in the second envelope measurement register 322.

Additionally, the comparator 351 compares the envelope measurements to one another. When the envelope measurements are unequal, the value of a counter (counter 353 for I-path calibration and counter 354 for Q-path calibration) is incremented or decremented as appropriate based on the result of the comparison, thereby adjusting the magnitude of the DC input current for the next iteration. Furthermore, new envelope measurements are obtained in response to the adjusted DC input current, and the comparator 351 thereafter compares the envelope measurements to one another. The adjustment to the DC input current is iterated until the envelope measurements are substantially equal to one another. After completing the calibration for each of the I-path and the Q-path, the values in the first counter 353 and the second counter 354 store DC input offsets suitable for providing LO nulling to the I-path and the Q-path, respectively.

The RF system 360 illustrates one embodiment of an RF system with closed-loop LO leakage compensation. However, the teachings herein are applicable to other implementations of LO leakage compensation.

Figure 7:
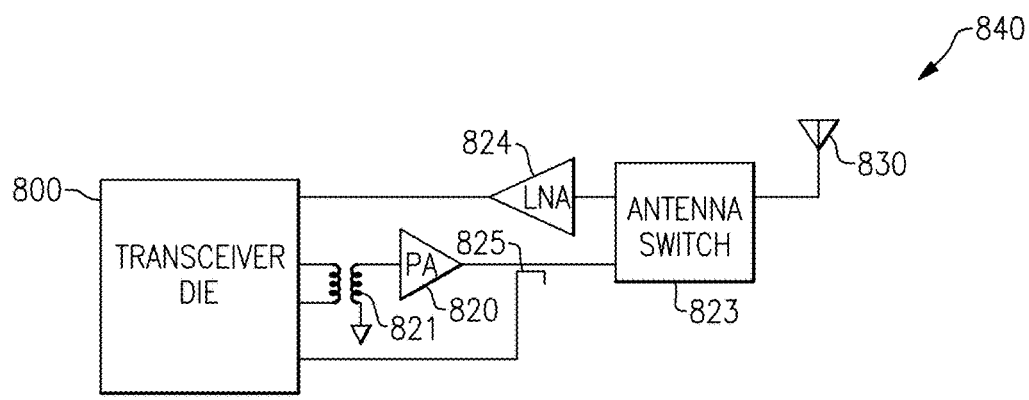
FIG. 7 is a schematic diagram of an RF communication system according to one embodiment.

FIG. 7 is a schematic diagram of an RF communication system 840 according to one embodiment. The RF communication system 840 includes a transceiver die 800, a power amplifier 820, a balun 821, an antenna switch 823, a low noise amplifier 824, a directional coupler 825, and an antenna 830.

The illustrated transceiver die 800 generates a differential transmit signal, which is provided to an input of the balun 821. The transceiver die 800 includes an LO leakage compensation circuit implemented in accordance with the teachings herein. For example, the transceiver die 800 can include any of the RF systems of FIGS. 1A, 1B, 4A, 4B, 4C, 4D, 4E, 4F, 5A, and/or 6 integrated therein.

The balun 821 converts the differential transmit signal to a single-end transmit signal suitable for amplification by the power amplifier 820. The power amplifier 820 generates an amplified radio frequency signal, which is provided to the antenna 830 via the antenna switch 823.

As shown in FIG. 7, a directional coupler 825 is provided at the output of the power amplifier 820. Including the directional coupler 825 aids in sensing a transmit power level of the power amplifier 820. In certain implementations, the sensed power level is provided to an observation receiver of the transceiver die 800.

Sensing the power amplifier's power level provides a number of advantages. In one example, the sensed power level is used for digital pre-distortion (DPD), which aids in linearizing the power amplifier 820 for different input power levels. For example, DPD can refer to processing of a signal in the digital domain before the signal is converted to analog, upconverted to radio frequency, and amplified by the power amplifier 820. DPD can be used to compensate for nonlinear effects of the power amplifier, including, for example, signal constellation distortion and/or signal spectrum spreading. DPD can not only improve the linearity of the power amplifier, but can also reduce power dissipation and/or enhance transmit spectral purity.

The antenna switch 823 is used to electrically couple the antenna 830 to the power amplifier 820 and to the low noise amplifier 824. The antenna switch 823 can provide not only switching functionality, but also duplexing and/or filtering of signals.

The low noise amplifier 824 is used to amplify a received signal from the antenna 830, and to provide the amplified receive signal to a receiver of the transceiver die 800.

The transceiver die 800 is implemented in accordance with one or more features of the present disclosure. For example, the transceiver die 800 can include any of the LO leakage compensation circuits described herein. Although FIG. 7 illustrates one embodiment of an RF communication system, the teachings herein can be used in a wide variety of electronic systems. For example, transmitters with LO leakage compensation can be used in RF electronics implemented in a wide variety of ways.

Figure 8:
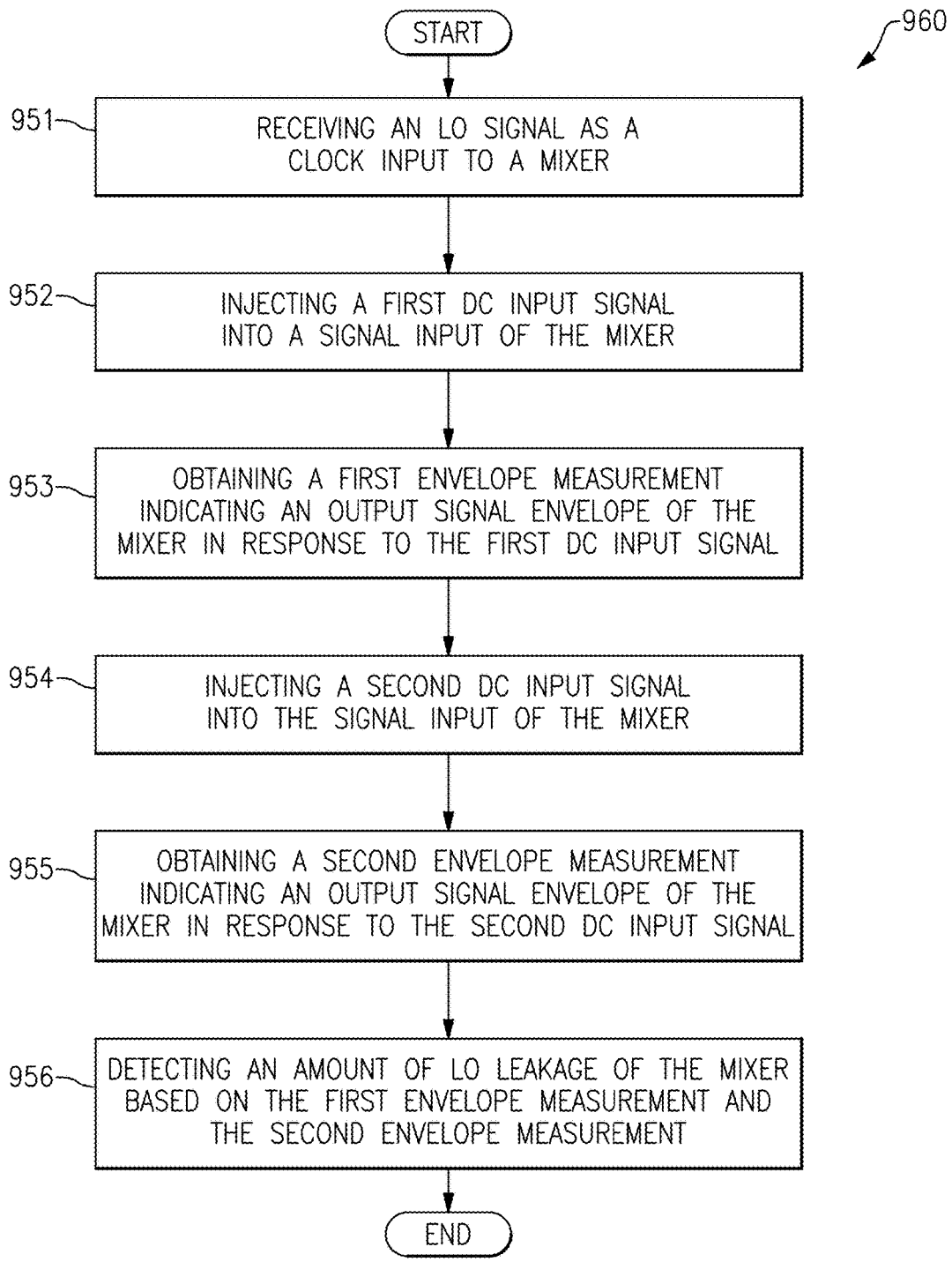
FIG. 8 is a diagram of a method of LO leakage compensation according to another embodiment.

FIG. 8 is a diagram of a method 960 of LO leakage compensation according to one embodiment. The method 960 can be realized using any of the LO leakage circuits described herein.

The method 960 begins at a block 951, in which an LO signal is received as a clock input to a mixer.

In an ensuing block 952, a first DC input signal is injected into a signal input of the mixer. The first DC input signal can be injected in a variety of ways, such as by using a DAC. In certain implementations, the first DC input signal is a DC input current.

The method 960 continues to a block 953, in which a first envelope measurement is obtained. The first envelope measurement indicates an output signal envelope of the mixer in response to the first DC input signal.

In certain implementations, the first envelope measurement corresponds to a DC measurement obtained by an envelope detector. For example, the envelope detector can be used to generate a DC measurement indicating a peak value, square value, RMS value, average value, and/or other suitable value of the output signal envelope. In certain implementations, the DC measurement is converted using an ADC to generate a digital representation of an analog envelope measurement. The first envelope measurement can be taken directly at the output of the mixer (for example, FIG. 1A) or downstream from the mixer (for example, FIG. 1B). The first envelope measurement can be stored for subsequent processing using any suitable memory elements, including, but not limited, latches (for instance, flip-flops or registers) and/or a programmable memory.

In an ensuing block 954, a second DC input signal is injected into the signal input of the mixer. The second DC input signal has a different value than the first DC input signal. In certain implementations, the first and second DC input signals are DC input currents of about equal magnitude but opposite polarity.

The method 960 continues at a block 955, in which a second envelope measurement is obtained. The second envelope measurement indicates the output signal envelope of the mixer in response to the second DC input signal. The second envelope measurement can be obtained using the same circuitry as used to obtain the first envelope measurement.

In an ensuing block 956, an amount of LO leakage of the mixer is detected based on the first envelope measurement and the second envelope measurement. In certain implementations, the amount of LO leakage is determined by the difference between the envelope measurements.

Although not illustrated in FIG. 8, the amount of LO leakage that is detected in block 956 can subsequently be used for providing LO leakage compensation. For example, the detected LO leakage can be used to select a DC input offset that nulls the LO leakage, thereby compensating the transmitter for impairments. In one example, the DC input offset is provided using the same circuitry that injects the DC input signals in block 952 and block 954. In another example, the DC input offset is digitally added via baseband processing.

In certain embodiments, the method 960 is performed iteratively. For example, after calibrating the RF system to compensate for the detected amount of LO leakage in block 956, the method can return to block 951 to determine a residual amount of LO leakage that remains. Such iterative adjustments can be performed one or more times to enhance the accuracy of LO leakage compensation.

Applications

Devices employing the above described schemes can be implemented into various electronic devices. Examples of electronic devices include, but are not limited to, consumer electronic products, parts of the consumer electronic products, electronic test equipment, communication infrastructure, etc. For instance, transmitter with LO leakage compensation can be used in a wide range of RF systems, including, but not limited to, base stations, mobile devices (for instance, smartphones or handsets), laptop computers, tablets, and wearable electronics. The teachings herein are applicable to RF systems operating over a wide range of frequencies and bands, including those using time division duplexing (TDD) and/or frequency division duplexing (FDD). A wide range of consumer electronics products can also include a transceiver for Internet of Things (IOT) applications and/or to provide the product with wireless connectivity. For instance, a transceiver with LO leakage compensation can be included in an automobile, a camcorder, a camera, a digital camera, a portable memory chip, a washer, a dryer, a washer/dryer, a copier, a facsimile machine, a scanner, a multi-functional peripheral device, or a wide range of other consumer electronics products. Furthermore, electronic devices can include unfinished products, including those for industrial, medical and automotive applications.

CONCLUSION

The foregoing description may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. A radio frequency (RF) transmitter with local oscillator (LO) leakage compensation, the RF transmitter comprising:
  a mixer comprising a signal input configured to receive an input signal, a clock input configured to receive an LO signal, and an output configured to generate an RF output signal; and
  an LO leakage compensation circuit configured to obtain a first envelope measurement indicating a signal envelope at the output based on injecting a first DC input current into the signal input, and to obtain a second envelope measurement indicating the signal envelope at the output based on injecting a second DC input current into the signal input, wherein the LO leakage compensation circuit is further configured to detect an amount of LO leakage of the mixer based on at least a comparison of the first envelope measurement to the second envelope measurement and on an amount of the first DC input current, and wherein the LO leakage compensation circuit is further configured to iteratively adjust a magnitude of the first DC input current and the second DC input current based on the comparison.

2. The RF transmitter of claim 1, wherein the first DC input current and second DC input current have about equal magnitude but opposite polarity.

3. The RF transmitter of claim 1, wherein the first envelope measurement and the second envelope measurement are each a DC measurement.

4. The RF transmitter of claim 1, wherein the LO leakage compensation circuit is further configured to detect the amount of LO leakage based on determining a difference between the first envelope measurement and the second envelope measurement, and to provide LO leakage compensation based on the difference.

5. The RF transmitter of claim 1, wherein the LO leakage compensation circuit is further configured to iteratively adjust the magnitude of the first DC input current and the second DC input current based on the comparison until the first envelope measurement and the second envelope measurement are substantially equal.

6. The RF transmitter of claim 1, wherein the LO leakage compensation circuit comprises an envelope detector configured to obtain the first envelope measurement and the second envelope measurement, and an ADC configured to generate a digital representation of the first envelope measurement and a digital representation of the second envelope measurement.

7. The RF transmitter of claim 6, wherein the LO leakage compensation circuit further comprises a digital subtractor configured to compute a difference between the digital representation of the first envelope measurement and the digital representation of the second envelope measurement.

8. The RF transmitter of claim 6, wherein the LO leakage compensation circuit further comprises a digital comparator configured to compare the first envelope measurement and to the second envelope measurement, and to control an input offset to the mixer based on the comparison.

9. The RF transmitter of claim 1, wherein the LO leakage compensation circuit comprises a DAC configured to inject, during calibration, the first DC input current and the second DC input current, and to inject, after calibration, an input offset to the mixer based on the amount of LO leakage detected to thereby compensate for the LO leakage.

10. A method of compensating a transmitter for local oscillator (LO) leakage, the method comprising:
  receiving an LO signal as a clock input to a mixer;
  injecting a first DC input current into a signal input of the mixer;
  obtaining a first envelope measurement indicating an output signal envelope of the mixer in response to the first DC input current;
  injecting a second DC input current into the signal input of the mixer;
  obtaining a second envelope measurement indicating the output signal envelope of the mixer in response to the second DC input current;
  detecting an amount of LO leakage of the mixer based on at least a comparison of the first envelope measurement and the second envelope measurement and on an amount of the first DC input current; and iteratively adjusting a magnitude of the first DC input current and the second DC input current based on the comparison.

11. The method of claim 10, wherein the first DC input current and second DC input current have about equal magnitude but opposite polarity.

12. The method of claim 10, wherein detecting the amount of LO leakage further comprises determining a difference between the first envelope measurement and the second envelope measurement, and providing LO leakage compensation based on the difference.

13. The method of claim 10, wherein the magnitude of the first DC input current and the second DC input current are iteratively adjusted based on the comparison until the first envelope measurement and the second envelope measurement are substantially equal.

14. An RF communication system comprising:
a power amplifier configured to provide amplification to an RF signal; and
a transceiver die configured to generate the RF signal, wherein the transceiver die comprises:
  a local oscillator (LO) configured to generate an LO signal;
  a mixer comprising a signal input configured to receive an input signal, a clock input configured to receive the LO signal, and an output configured to control the RF signal; and
  an LO leakage compensation circuit configured to obtain a first envelope measurement indicating a signal envelope at the output of the mixer based on injecting a first DC input current into the signal input, and to obtain a second envelope measurement indicating the signal envelope at the output of the mixer based on injecting a second DC input current into the signal input, wherein the LO leakage compensation circuit is further configured to detect an amount of LO leakage of the mixer based on at least comparing the first envelope measurement to the second envelope measurement and on an amount of the first DC input current, and wherein the LO leakage compensation circuit is further configured to iteratively adjust a magnitude of the first DC input current and the second DC input current based on the comparison.

15. The RF communication system of claim 14, wherein the first DC input current and second DC input current have about equal magnitude but opposite polarity.

16. The RF communication system of claim 14, wherein the LO leakage compensation circuit is further configured to detect the amount of LO leakage based on determining a difference between the first envelope measurement and the second envelope measurement.

17. The RF communication system of claim 14, wherein the LO leakage compensation circuit is further configured to iteratively adjust the magnitude of the first DC input current and the second DC input current based on the comparison until the first envelope measurement and the second envelope measurement are substantially equal.

18. The RF communication system of claim 14, wherein the LO leakage compensation circuit is further configured to compensate for LO leakage by controlling an input offset to the mixer based on an amount of LO leakage detected.

19. The RF communication system of claim 14, wherein the LO leakage compensation circuit comprises an envelope detector configured to output the first envelope measurement and the second envelope measurement as DC measurements.

20. The RF communication system of claim 14, wherein the LO leakage compensation circuit comprises a DAC configured to inject, during calibration, the first DC input current and the second DC input current, and to inject, after calibration, an input offset to the mixer based on the amount of LO leakage detected to thereby compensate for the LO leakage.

* * * * *